United States Patent
Hibi

(10) Patent No.: US 9,239,977 B2
(45) Date of Patent: Jan. 19, 2016

(54) PRINT CONTROL APPARATUS CAUSING A PRINT UNIT TO PRINT AN IMAGE

(71) Applicant: CANON KABUSHIKI KAISHA, Tokyo (JP)

(72) Inventor: Makoto Hibi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/316,591

(22) Filed: Jun. 26, 2014

(65) Prior Publication Data

US 2015/0002883 A1 Jan. 1, 2015

(30) Foreign Application Priority Data

Jun. 28, 2013 (JP) ................................. 2013-137057

(51) Int. Cl.
G06K 15/00 (2006.01)
H04N 1/393 (2006.01)
H04N 1/00 (2006.01)
H04N 1/46 (2006.01)

(52) U.S. Cl.
CPC .............. *G06K 15/4065* (2013.01); *H04N 1/00* (2013.01); *H04N 1/393* (2013.01); *H04N 1/46* (2013.01)

(58) Field of Classification Search
None
See application file for complete search history.

(56) References Cited

U.S. PATENT DOCUMENTS

| 2006/0075909 A1* | 4/2006 | Hoshi et al. .................... 101/114 |
| 2007/0195336 A1* | 8/2007 | Uotani ............................ 358/1.1 |
| 2008/0074694 A1* | 3/2008 | Saida ........................... 358/1.15 |

FOREIGN PATENT DOCUMENTS

JP 2007-203703 A 8/2007

* cited by examiner

*Primary Examiner* — Jeremiah Bryar
(74) *Attorney, Agent, or Firm* — Canon USA Inc. IP Division

(57) ABSTRACT

It is determined whether printing of an image having a size corresponding to a preset size set as print settings for data to be printed on a print medium is allowed based on the preset size and one or more candidates of the size of the print medium obtained by detecting the size of the print medium using a sensor. If it is determined that the printing is allowed, a screen inquiring whether an image based on the data to be printed having a size corresponding to the preset size is printed is displayed. If the printing is instructed via the screen, the image is printed on the print medium.

38 Claims, 14 Drawing Sheets

| | | | | | CLOSE SHEET SIZE | | | | | | | | |
|---|---|---|---|---|---|---|---|---|---|---|---|---|---|
| SHEET SIZE | WIDTH | HEIGHT | ASPECT RATIO | L | ENVELOPE #6 | POSTCARD | 4 × 6 | ENVELOPE #3 | 2L | DOUBLE POSTAL CARD | 6P | A4 | LETTER |
| L | 89.0 | 127.0 | 1.43 | - | | | | | | | | | |
| ENVELOPE #6 | 98.0 | 190.0 | 1.94 | | - | × | × | | | | | | |
| POSTCARD | 100.0 | 148.0 | 1.48 | | × | - | × | | | | | | |
| 4 × 6 | 101.6 | 152.4 | 1.50 | | × | × | - | | | | | | |
| ENVELOPE #3 | 120.0 | 235.0 | 1.96 | | | | | - | | | | | |
| 2L | 127.0 | 178.0 | 1.40 | | | | | | - | | | | |
| DOUBLE POSTAL CARD | 200.0 | 148.0 | 0.74 | | | | | | | - | × | × | × |
| 6P | 203.2 | 254.0 | 1.25 | | | | | | | × | - | × | × |
| A4 | 210.0 | 297.0 | 1.41 | | | | | | | × | × | - | × |
| LETTER | 215.9 | 279.4 | 1.29 | | | | | | | × | × | × | - |

| SHEET SIZE | WIDTH | HEIGHT | ASPECT RATIO |
|---|---|---|---|
| L | 89.0 | 127.0 | 1.43 |
| ENVELOPE #6 | 98.0 | 190.0 | 1.94 |
| POSTCARD | 100.0 | 148.0 | 1.48 |
| 4 × 6 | 101.6 | 152.4 | 1.50 |
| ENVELOPE #3 | 120.0 | 235.0 | 1.96 |
| 2L | 127.0 | 178.0 | 1.40 |
| DOUBLE POSTAL CARD | 200.0 | 148.0 | 0.74 |
| 6P | 203.2 | 254.0 | 1.25 |
| A4 | 210.0 | 297.0 | 1.41 |
| LETTER | 215.9 | 279.4 | 1.29 |

| SHEET SIZE | WIDTH | HEIGHT | ASPECT RATIO | CLOSE SHEET SIZE ||||||||||
| | | | | L | ENVELOPE #6 | POSTCARD | 4 × 6 | ENVELOPE #3 | 2L | DOUBLE POSTAL CARD | 6P | A4 | LETTER |
|---|---|---|---|---|---|---|---|---|---|---|---|---|---|
| L | 89.0 | 127.0 | 1.43 | - | | | | | | | | | |
| ENVELOPE #6 | 98.0 | 190.0 | 1.94 | | - | × | | | | | | | |
| POSTCARD | 100.0 | 148.0 | 1.48 | | × | - | × | | | | | | |
| 4 × 6 | 101.6 | 152.4 | 1.50 | | × | × | - | | | | | | |
| ENVELOPE #3 | 120.0 | 235.0 | 1.96 | | | | | - | | | | | |
| 2L | 127.0 | 178.0 | 1.40 | | | | | | - | | | | |
| DOUBLE POSTAL CARD | 200.0 | 148.0 | 0.74 | | | | | | | - | × | × | × |
| 6P | 203.2 | 254.0 | 1.25 | | | | | | | × | - | × | × |
| A4 | 210.0 | 297.0 | 1.41 | | | | | | | × | × | - | × |
| LETTER | 215.9 | 279.4 | 1.29 | | | | | | | × | × | × | - |
| 300 | 301 | 302 | 303 | 304 | | | | | | | | | |

PRINT CONTROL APPARATUS CAUSING A PRINT UNIT TO PRINT AN IMAGE

BACKGROUND

1. Field

Aspects of the present invention generally relate to a print control apparatus for printing an image to be printed, a print control method, and a storage medium.

2. Description of the Related Art

Technology for controlling a print operation by comparing the sheet size specified through an operation panel of a printer or an operation screen of a device that transmits a print job with the size of sheets set in the printer has been developed. For example, Japanese Patent Laid-Open No. 2007-203703 describes the following technology. That is, a sensor for detecting a sheet size is provided in a printer. By comparing the sheet size preset in a print job with the detected sheet size, mismatch of the sheet sizes can be detected. If mismatch occurs, a mismatch message is sent to a user.

However, according to the technology described in Japanese Patent Laid-Open No. 2007-203703, if mismatch of the sheet sizes occurs, two options "continue the print process" and "cancel" are displayed on a display screen for a user.

In such a case, when the sheet size preset in the print job is larger than the size of sheets set in the printer and if the user selects "continue the print process", the image to be printed may be printed beyond the edges of the sheet.

SUMMARY

Aspects of the present invention generally provide a print control apparatus, a print control method, and a storage medium capable of printing an image of an appropriate size based on a preset size and the size of a print medium detected by a sensor. According to an aspect of the present invention, a print control apparatus includes a determination unit configured to, if a preset size of a print medium set as print settings for data to be printed is not included in one or more candidates of a size of the print medium obtained by a sensor that detects the size of the print medium, determine whether printing of an image having a size corresponding to the preset size on the print medium is allowed based on the preset size and the one or more candidates, a display control unit configured to, if the determination unit determines that the printing is allowed, display, on a display unit, a screen inquiring whether an image based on the data to be printed having a size corresponding to the preset size is printed, and a print control unit configured to, if an instruction is provided to print the image based on the data to be printed having a size corresponding to the preset size via the screen displayed by the display control unit, cause a print unit to print the image.

Further features of the present disclosure will become apparent from the following description of exemplary embodiments with reference to the attached drawings.

BRIEF DESCRIPTION OF THE DRAWINGS

FIGS. 4A and 4B illustrate sheet size tables according to an exemplary embodiment.

DESCRIPTION OF THE EMBODIMENTS

Figure 1:
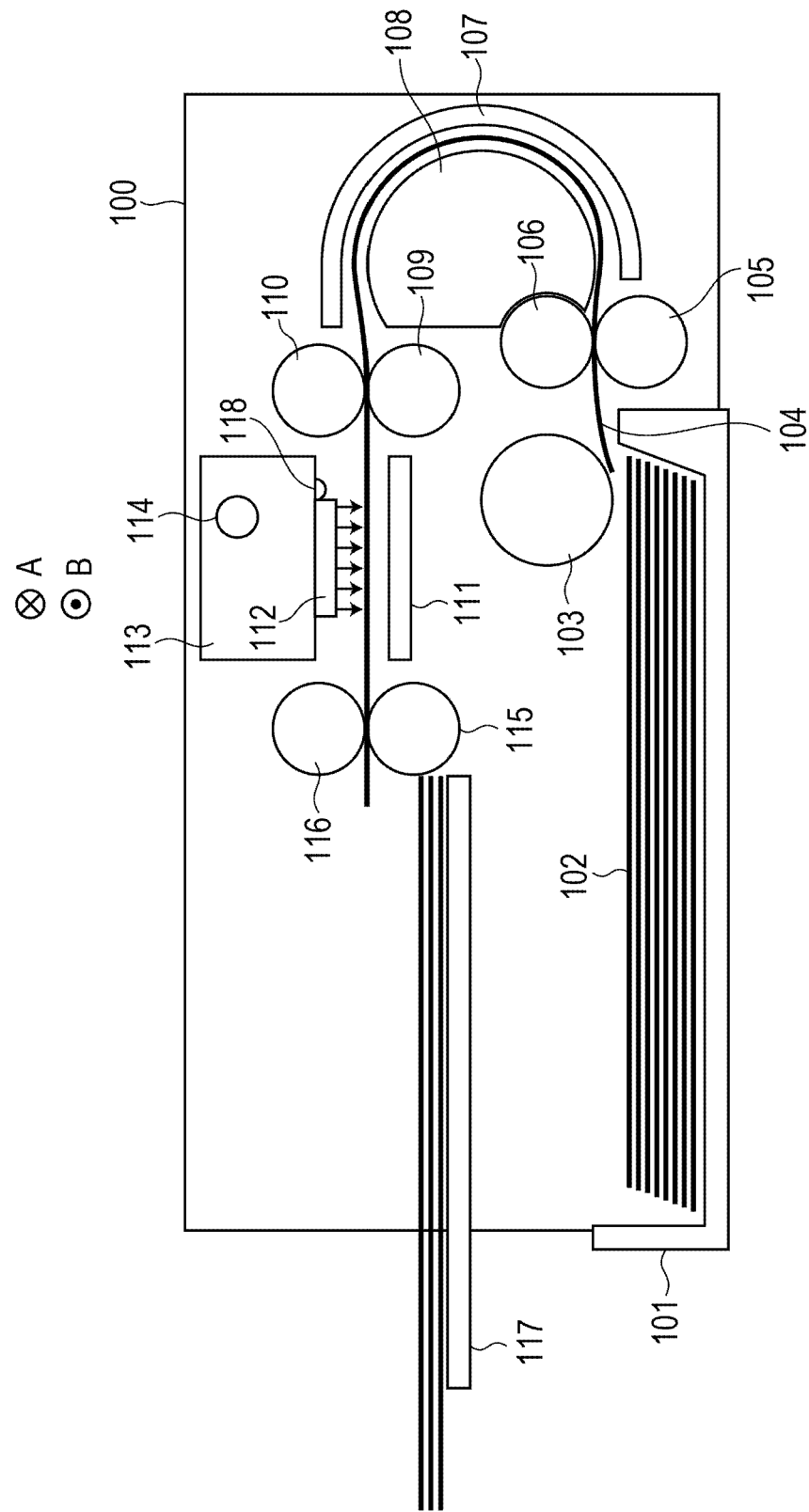
FIG. 1 illustrates a printing mechanism of a printer.

FIG. 1 illustrates a printing mechanism of a printer 100 according to an exemplary embodiment. Print sheets are set in a paper feed tray 101. A feed roller 103 feeds the print sheets set in the paper feed tray 101 to conveyance rollers 105 and 106. Each of print sheets 104 is fed by the feed roller 103 and is conveyed by the conveyance rollers 105 and 106. As illustrated in FIG. 1, each of the print sheets 104 is conveyed by the conveyance rollers 105 and 106 and passes through a conveyance path formed by members 107 and 108. Thus, the print sheet 104 is conveyed to conveyance rollers 109 and 110. The conveyance rollers 109 and 110 convey the print sheet 104 to a platen 111.

A carriage 113 having a print head 112 mounted thereon is disposed above the platen 111. The carriage 113 reciprocally scans along a guide rail 114 in a direction of an arrow A illustrated in FIG. 1 (the direction from the front to the back of the page of FIG. 1) and a direction of an arrow B (the direction from the back to the front of the page of FIG. 1). The printer 100 causes the carriage 113 to scan in the A direction and the B direction and applies driving pulses to the print head 112. In this manner, the printer 100 causes the print head 112 to eject a recording agent, such as ink. By causing the print head 112 to eject the recording agent onto the print sheet 104, the printer 100 prints an image to be printed on the print sheet 104. The print sheet 104 having the image printed thereon is further conveyed to sheet discharging rollers 115 and 116 by the conveyance rollers 109 and 110. The sheet discharging rollers 115 and 116 output the print sheet 104 onto a paper output tray 117.

The carriage 113 further includes a sheet sensor 118 mounted therein. The sheet sensor 118 is a reflective optical sensor. The printer 100 acquires the output voltage level indicating the intensity of light received by the sheet sensor 118 and determines whether the output voltage level is the same as the level of light reflected by a print sheet. In this manner, the printer 100 can detect whether the print sheet 104 is located at the position from which the light is received. In addition, as described above, the sheet sensor 118 is mounted in the carriage 113 and, thus, the sheet sensor 118 scans together with the print head 112. By detecting whether the print sheet 104 is located in a scan range in which the sheet sensor 118 scans, the printer 100 can detect the edges of the print sheet 104. Thus, the printer 100 can detect the width of the print sheet 104 on the basis of the distance between the right and left edges of the print sheet 104. The detection process is described in detail with reference to FIG. 2. The scanning position of the sheet sensor 118 (the carriage 113) is detected by an encoder 224 (described in more detail below).

The printer 100 includes the paper feed tray 101, the platen 111, the print head 112, the carriage 113, the guide rail 114, the paper output tray 117, as described above. In addition, the printer 100 includes the above-described variety of rollers as a printing mechanism.

Figure 2:
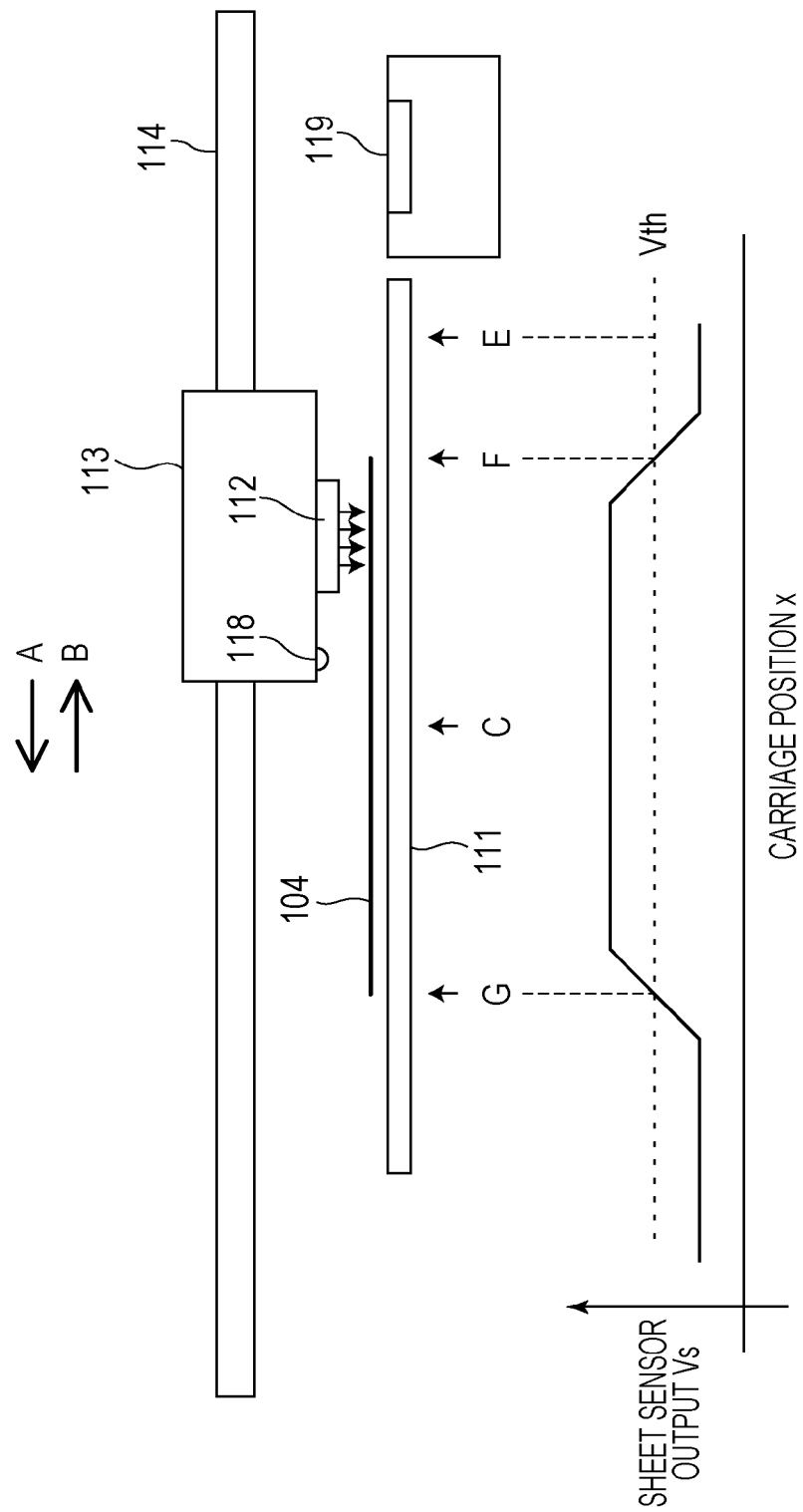
FIG. 2 illustrates detection of a sheet width using a sheet sensor.

FIG. 2 illustrates detection of a sheet width using the sheet sensor 118.

As described above, the printer 100 reciprocally moves the carriage 113 along the guide rail 114 in the direction of the arrow A and the direction of the arrow B. At the same time, the printer 100 causes the print head 112 to eject a recording agent. In this manner, the printer 100 prints an image on the print sheet 104. A head recovery mechanism 119 for capping the print head 112 is disposed at a position of the platen 111 outside the moving range of the carriage 113 (a position x of the sheet sensor). The position x of the sheet sensor is identified by the position of the carriage 113 detected by an encoder 224 (described in more detail below).

The sheet sensor 118 scans over the platen 111 to receive light and detects the output voltage level of the received light. A graph illustrated in FIG. 2 represents the output voltage level detected by the sheet sensor 118 in the moving range of the carriage 113. Note that according to the present exemplary embodiment, the print sheet 104 has a bright color, such as white, and the platen 111 has a dark color, such as black. Accordingly, a high output voltage level (a high-intensity reflected light from the print sheet 104) is acquired from a position at which the print sheet 104 is located on the platen 111. In contrast, a low output voltage level (a low-intensity reflected light from the platen 111) is acquired from a position at which the print sheet 104 is not located on the platen 111.

When the carriage 113 is located at the position of the head recovery mechanism 119, the sheet sensor 118 receives reflected light from the platen 111 at a position E. Thereafter, if the carriage 113 moves in the A direction, the output voltage level rises at a position corresponding to an edge of the print sheet 104. The printer 100 continuously acquires a substantially constant output voltage level during a period of time when the carriage 113 moves from the edge to an edge opposite to the edge of the print sheet 104. When the carriage 113 reaches the opposite edge, the output voltage level falls.

According to the present exemplary embodiment, if the output voltage level of the sheet sensor 118 is higher than a predetermined threshold value Vth, it is determined that the print sheet 104 is located at a position at which the output voltage level is detected. More specifically, in FIG. 2, positions G and F indicate the positions of the edges of the print sheet 104. The range between the positions G and F is a range in which the print sheet 104 is located. Thus, the distance between the positions G and F is detected as the sheet width of the print sheet 104.

Note that according to the present exemplary embodiment, the printer 100 conveys the print sheet in a centered fashion so that the center of the print sheet 104 coincides with the center position C of the platen 111. At that time, if the right edge of the print sheet 104 is displaced to the right of a point E in FIG. 2, detection of the position of the right edge of the print sheet 104 may fail.

Therefore, according to the present exemplary embodiment, if the right edge of the print sheet 104 is displaced to the right of the point E, the printer 100 obtains the sheet width of the print sheet 104 using the distance between the center position C and the position G of the left edge of the print sheet 104. More specifically, if the output voltage level at the position E is higher than Vth, it is determined that the position of the right edge of the print sheet 104 is located at the position E or a position to the right of the position E. In such a case, the sheet width of the print sheet 104 is obtained by doubling the distance between the center position C and the position G.

That is, since the printer 100 conveys the print sheet 104 so that the center of the print sheet 104 coincides with the center position C, the distance between the center position C and the position G of the left edge of the print sheet 104 is half the sheet width. Accordingly, the printer 100 can obtain the sheet width by doubling the distance between the center position C and the position G. Note that the value indicating the center position C of the scanning area of the carriage is prestored in a memory of the printer 100. By referring to the value, the printer 100 can obtain the distance between the center position C and the position G.

Note that the above-described threshold value Vth is not necessarily a fixed value. For example, the threshold value Vth may be changed in accordance with the output voltage level at the position E. Alternatively, the threshold value Vth may be determined in accordance with the intensity of the reflected light caused by the characteristics of the surface of a print medium. More specifically, the threshold value Vth may be determined in accordance with the type of print sheet (e.g., plain paper or glossy paper). In the description above, to detect the presence of a print sheet, it is determined whether the output voltage level is higher than the threshold value. However, it may be determined whether a print sheet is present by using a result of comparison of the output voltage level at the position E and the output voltage level at another position. For example, if it is determined that the print sheet is not present at the position E using the output voltage level at the position E, it may be determined that the print sheet is present at a position at which the output voltage level is higher than the output voltage level at the position E by a predetermined value or greater.

In the method illustrated in FIG. 2, the carriage 113 includes the sheet sensor 118, and the sheet sensor 118 moves to detect a print sheet. The technique is not limited thereto. For example, a sheet sensor may be disposed on the platen 111 separately from the carriage 113. In such a case, by arranging a number of sheet sensors corresponding to the width of the conveyance path of the print sheet 104 and determining whether each of the sheet sensors detects the presence of the print sheet 104, the width of the print sheet 104 can be detected.

Figure 3:
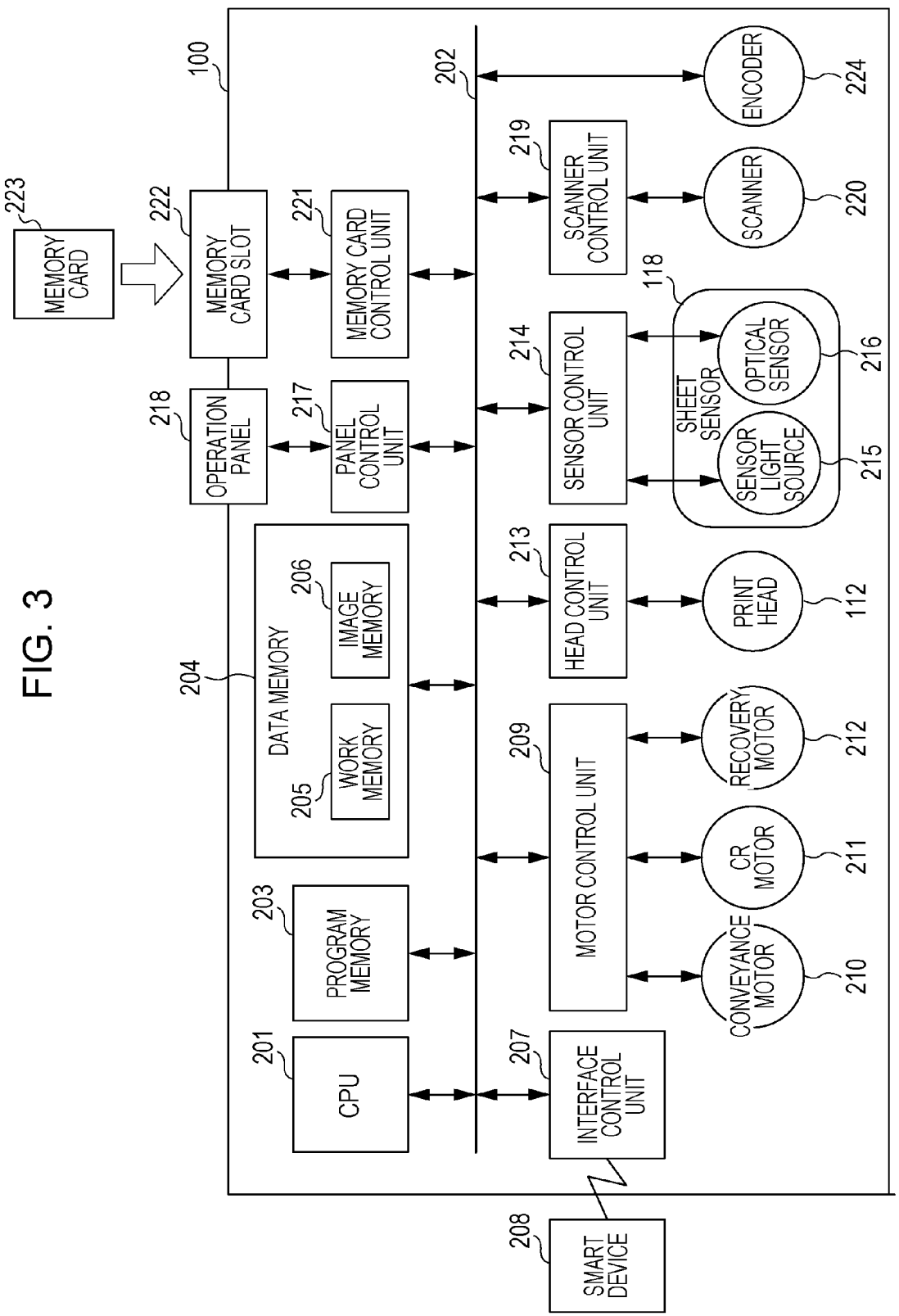
FIG. 3 is a block diagram of an exemplary configuration of the printer.

The configuration of the printer 100 is described next. FIG. 3 is a block diagram of an exemplary configuration of the printer 100.

A CPU 201 is a processor for performing overall control of the printer 100. The CPU 201 is connected to a program memory 203 (e.g., a read only memory (ROM) or a hard disk) and a data memory 204 (e.g., a random access memory (RAM)) via an internal bus 202. The program memory 203 stores a program for controlling the printer 100. The CPU 201 loads the program stored in the program memory 203 into the data memory 204 and executes the program using a work memory 205 assigned to the data memory 204. Thus, the CPU 201 can control the printer 100. In addition, the data memory 204 includes an image memory 206 assigned thereto. A variety of data, such as image data to be printed by the printer 100, are rasterized in the image memory 206.

An interface control unit 207 communicates with a smart device 208, such as a smartphone, via an interface under the control of the CPU 201. For example, the interface control unit 207 can receive a print job from the smart device 208 and send the status information about the printer 100 to the smart device 208. Note that the interface control unit 207 may communicate with the smart device 208 via a wired interface, such as a universal serial bus (USB) cable, or a wireless interface, such as an infrared communication interface or a wireless LAN. Examples of the smart device 208 include, but not limited to, a smartphone, a tablet, and a cell phone.

The interface control unit 207 can communicate with not only the smart device 208 but a personal computer. In addition, the interface control unit 207 can communicate with a server connected thereto via a network. Furthermore, the interface control unit 207 can communicate with a facsimile apparatus and a digital TV. Note that the printer 100 can receive data to be printed from not only a print job but an external device, such as a server, using the address information included in a print job.

A motor control unit 209 controls a variety of motors for driving the printing mechanism of the printer 100 under the control of the CPU 201. A conveyance motor 210 drives the feed roller 103, the conveyance rollers 105, 106, 109, and 110 and the sheet discharging rollers 115 and 116 illustrated in FIG. 1 under the control of the motor control unit 209. A carriage motor (CR motor) 211 drives the carriage 113 under the control of the motor control unit 209 to reciprocally move the carriage 113. A recovery motor 212 drives the head recovery mechanism 119 under the control of the motor control unit 209.

A head control unit 213 controls the print head 112 under the control of the CPU 201 so that the print head 112 ejects the recording agent, such as ink. By driving the print head 112 and the conveyance motor 210 at the same time, the CPU 201 can scan the print head 112 and print an image on the print sheet 104. That is, the CPU 201 in the printer 100 operates as a print control apparatus, which controls the variety of motors and the print head 112 serving as a printing mechanism to print an image using the printing mechanism.

Under the control of the CPU 201, a sensor control unit 214 causes a sensor light source 215 included in the sheet sensor 118 to emit light and causes an optical sensor 216 included in the sheet sensor 118 to receive reflected light. In addition, the sensor control unit 214 acquires the output voltage level indicating the intensity of the light received by the optical sensor 216. The CPU 201 receives the output voltage level acquired by the sensor control unit 214. Thus, the CPU 201 can detect the sheet width illustrated in FIG. 2. Note that by performing a process described below, the CPU 201 can determine the sheet size including the height of the print sheet 104 in accordance with the sheet size detected as described above.

A panel control unit 217 controls an operation panel 218 under the control of the CPU 201. Note that the operation panel 218 includes an operation device (e.g., keys or a touch panel) that a user operates and a display panel that can display a variety of information items, such as an image. For example, if the user operates the operation device of the operation panel 218, an instruction from the user is input to the panel control unit 217. Thereafter, the instruction is input to the CPU 201. In addition, upon receiving an instruction from the CPU 201, the panel control unit 217 displays an image loaded into the image memory 206 on the display panel of the operation panel.

A scanner control unit 219 controls a scanner 220 under the control of the CPU 201. The scanner control unit 219 causes the scanner 220 to scan document placed on a platen glass of the scanner 220 and receives the readout image. In addition, the scanner control unit 219 stores the readout image in the image memory 206. A memory card control unit 221 reads and writes a variety of data from and to a memory card 223 mounted in a memory card slot 222 under the control of the CPU 201.

An encoder 224 identifies the position of the carriage 113 when the carriage 113 scans along the guide rail 114. The CPU 201 identifies the position x of the sheet sensor illustrated in FIG. 2 using the position of the carriage 113 identified by the encoder 224 and a position at which the sheet sensor 118 is mounted on the carriage 113.

According to the present exemplary embodiment, the CPU 201 detects the sheet size including the height of the sheet in accordance with the sheet width detected by the sheet sensor 118 in the above-described manner. Note that in the printer 100 according to the present exemplary embodiment, the sheet sensor 118 is provided in each of the print head 112 and the carriage 113. The members such as the variety of motors and the guide rail 114 for moving the carriage 113 and the encoder 224 for identifying the position of the carriage 113 are used for a print operation performed by the print head 112 and a sheet width detecting operation performed by the sheet sensor 118. Accordingly, in order to detect the sheet width, the need for members other than the above-described members for a print operation can be eliminated and, thus, an increase in the size of the printer 100 can be prevented.

FIGS. 4A and 4B illustrate sheet size tables according to the present exemplary embodiment. A sheet size table illustrated in FIG. 4A contains the following fields: a sheet size 300 that can be used by the printer 100, and a sheet width 301, a sheet height 302, and an aspect ratio 303 corresponding to the sheet size. Note the sheet width 301 and the sheet height 302 are expressed in units of millimeter (mm).

The sheet size table is stored in the program memory 203. By loading the sheet size table from the program memory 203 to the data memory 204, the CPU 201 can reference the sheet size table. Note that the information regarding the sheet width 301 is not necessarily stored in the form of a table. That is, a variety of a technique for storing the sheet width 301 in association with a sheet size can be employed.

According to the present exemplary embodiment, the CPU 201 determines the size of the print sheet 104 in accordance with the sheet width detected by the sheet sensor 118. More specifically, the CPU 201 determines the size of the print sheet 104 conveyed in the printer 100 from the sheet size 300 having the sheet width 301 within a predetermined range of the sheet width detected by the sheet sensor 118. The reason for using the predetermined range is because an error may occur between the result of detection of the sheet sensor 118 and an actual sheet width due to a variation in the intensity of the reflected light in accordance with, for example, the state of the print sheet 104 and an environment in which the printer 100 is installed.

For example, let the above-described predetermined range be ±3 mm. Then, if a sheet width of 126.0 mm is detected by the sheet sensor 118, the sheet size 300 corresponding to the sheet width 301 in the range from 123.0 mm to 129.0 mm is selected as a candidate size of the print sheet 104. As can be seen from the sheet size table in FIG. 4A, in such a case, the size "2L" corresponding to the sheet width 301 (127.0 mm) is selected as a candidate.

Alternatively, instead of uniquely selecting the sheet size, a plurality of sheet sizes having a close sheet width may be selected as candidates of the size of the print medium. For example, if a width of 99.0 mm is detected by the sheet sensor 118 as the sheet width, the range of a sheet width from 96.0 mm to 102.0 mm includes the sheet widths of an envelope #6 (98.0 mm), a post card (100.0 mm), and a 4×6 sheet (101.6 mm). Similarly, if a width of 213.0 mm is detected by the sheet sensor 118 as the sheet width, an A4 size (the sheet width=210.0 mm) and a letter size (the sheet width=215.9 mm) are selected as candidates of the sheet size.

According to the present exemplary embodiment, if the size of a print sheet is preset as the print settings, it is determined whether one or more candidates for the size of the print sheet detected by the sheet sensor 118 include the size specified by the user. If the size specified by the user is included in one or more candidates, an image corresponding to the specified size is printed on the print sheet.

However, if the size specified by the user as the print settings is not included in the one or more candidates, the print operation is restricted.

Accordingly, if the user inadvertently specifies a size that significantly differs from the size of the print sheet used in printing or if the print sheet having a size that significantly differs from the size specified by the user is conveyed, an appropriate action can be taken. More specifically, in such a case, printing of an image having a size that significantly differs from the size of the print sheet can be prevented. The above-described process according to the present exemplary embodiment is described in more detail below.

Note that the above-described print settings are made in accordance with a user instruction using, for example, a host computer or a smart device that transmits a print job to the printer 100. More specifically, the host computer or the smart device displays, for the user, a display screen for setting up the size and type of the print sheet and margins of the page set during printing. For example, the user selects data to be printed first and, thereafter, performs print settings through the above-described display screen. Thus, print settings can be made for the data to be printed. Print setting information indicating the print settings made by the user in this manner is sent from the host computer or the smart device to the printer 100 together with the data to be printed. Note that the print setting information and the data to be printed may be included in a print job and be sent to the printer 100. Alternatively, the data to be printed and the print setting information may be separately sent. Still alternatively, like a digital print order format (DPOF) file, the print setting information including the preset sheet size may be sent to the printer 100 in the form of a file separately from a file including the data to be printed.

Note that as illustrated in FIG. 2, according to the present exemplary embodiment, if the print sheet 104 is large, one of the edges of the print sheet 104 may go undetected by the sheet sensor 118. At that time, the sheet width is detected through calculation based on the distance between the center position C and the position G. In such a case, the print sheet 104 may be conveyed with the center of the print sheet 104 displaced from the center position C due to, for example, the characteristics of the print sheet 104. Accordingly, if one of the edges of the print sheet 104 is not detected, the above-described predetermined range may be increased from ±3 mm to a relatively large value, for example, ±10 mm. In such a case, if, for example, a sheet width of 210 mm is detected, the following sheet sizes are selected as the candidates: a double postal card size (the sheet size=200.0 mm), a 6P size (the sheet size=203.2 mm), an A4 size (the sheet size=210.0 mm), and a letter size (the sheet size=215.9 mm).

In addition, in the above-described example, the sheet size included in a predetermined range (e.g., ±3 mm) from the sheet width detected by the sheet sensor 118 is selected. However, the range according to the technique is not limited thereto. For example, a sheet size included in a range that is larger than the detection result by a predetermined width (e.g., +3 mm) may be selected. Conversely, a sheet size included in a range that is smaller than the detection result by a predetermined width may be selected. Alternatively, the predetermined range may be changed in accordance with the type of the print sheet (e.g., plain paper or glossy paper). For example, if the print sheet is a glossy paper sheet, the intensity of light reflected by the sheet is higher than that of a plain paper sheet. At that time, the output voltage level acquired at a position that is not the position of the print sheet by the sheet sensor 118 may be higher than the predetermined threshold value Vth and, thus, it may be determined that the print sheet is located at the position. Accordingly, for example, if the type of print sheet is plain paper, the range may be set to the range of ±3 mm. In addition, if the type is glossy paper, the range may be set to the range of - 6 mm. In addition, the predetermined range may be set in accordance with various conditions, such as the characteristics of the sheet sensor 118.

Furthermore, while the above description has been made with reference to determination of the sheet size using the sheet size table illustrated in FIG. 4A, the sheet size table illustrated in FIG. 4B may be employed.

In addition to the information items in the sheet size table illustrated in FIG. 4A, the sheet size table illustrated in FIG. 4B further contains sheet information 304 indicating a sheet size having a close sheet width. More specifically, in the table, the sheet size having an entry including the symbol "x" indicates a corresponding sheet size having a close sheet width. For example, the sheet size table indicates that an A4 size and a letter size have sheet widths that are close to each other. In addition, the sheet size table indicates that an envelope #6 size, a post card size, and a 4×6 size have sheet widths that are close to one another.

By loading the sheet size table illustrated in FIG. 4B from the program memory 203 to the data memory 204, the CPU 201 can reference the sheet width 301. If the sheet width is detected by the sheet sensor 118, the CPU 201 identifies the sheet size corresponding to the detected sheet width. Thereafter, if a sheet size having a sheet width close to the detected sheet width is found in the sheet size table, the CPU 201 identifies a plurality of candidates of the sheet size including the sheet size having a close sheet width.

For example, if the sheet width detected by the sheet sensor 118 is 90.0 mm, an L size is uniquely selected as the sheet size. In contrast, if the sheet width detected by the sheet sensor 118 is 99.0 mm, a post card size having a sheet width that is the closest to the detected sheet width is selected. In addition to the post card size, the envelope #6 size and the 4×6 size specified in the sheet information 304 are selected.

As described above, the CPU 201 selects the sheet size of the print sheet having the sheet width 301 and further having the sheet height 302 on the basis of the sheet size table illustrated in FIG. 4A or 4B. Thereafter, the CPU 201 performs a print process corresponding to the selected sheet size.

Note that the CPU 201 can select any sheet size other than the standard sheet sizes illustrated in FIGS. 4A and 4B as a sheet size to be set up and perform a print operation. More specifically, the user can specify the sheet width and the sheet height in millimeters as the sheet size. Thereafter, by reducing or enlarging the image to be printed so that the image fits the preset sheet width and height, the image having a size that fits the preset sheet size can be printed.

Figure 5:
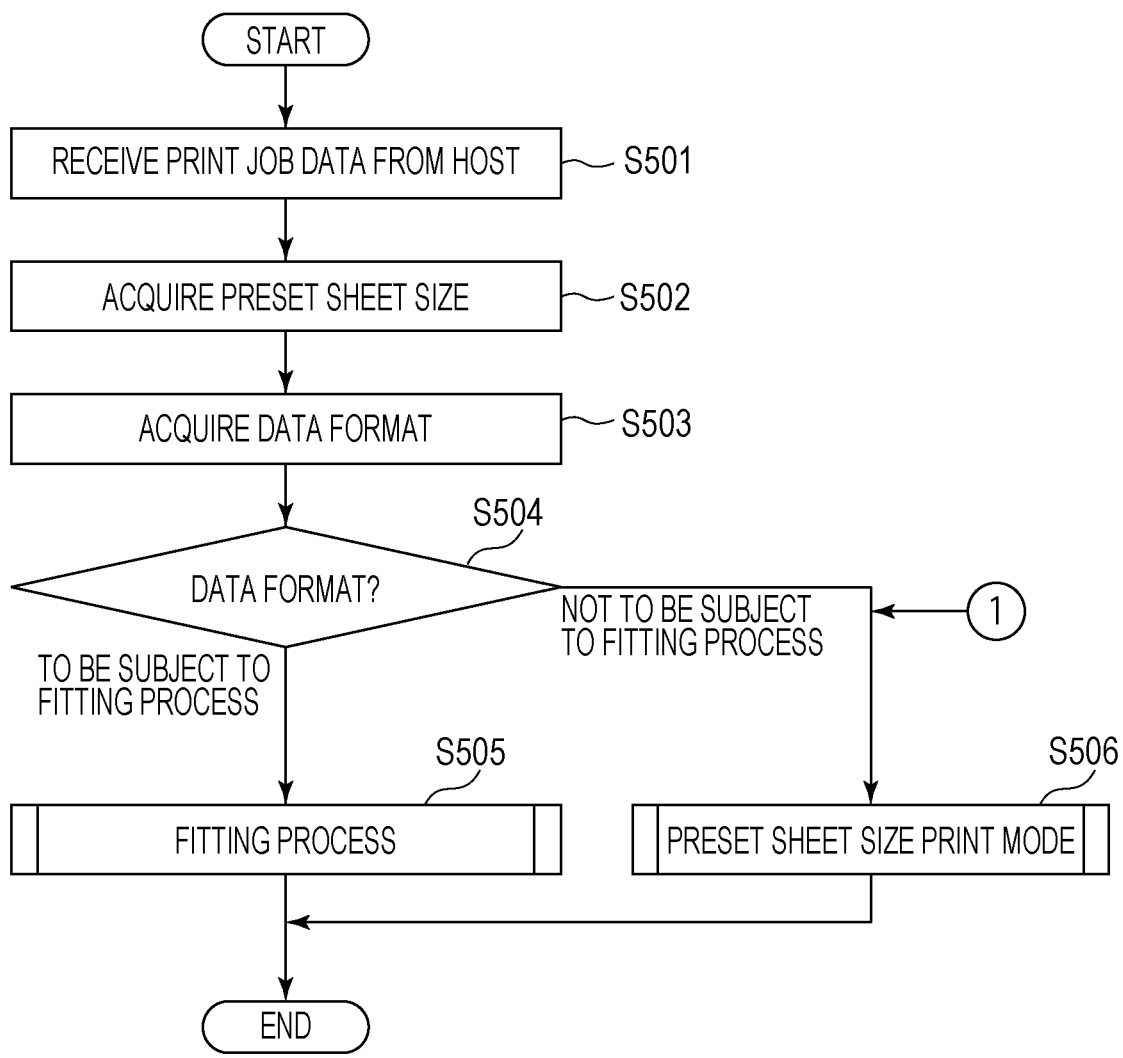
FIG. 5 is a flowchart illustrating an example of a print control process.

FIG. 5 is a flowchart illustrating an example of a print control process performed by the CPU 201. Note that a program corresponding to the process illustrated in FIG. 5 is stored in the program memory 203. The CPU 201 loads the program into the work memory 205 and executes the program in the work memory 205. In this manner, the CPU 201 can realize the processes performed in the steps of the flowchart illustrated in FIG. 5.

In step S501, the CPU 201 receives print job data from the smart device 208 and performs storage control to store the received print job data in a predetermined area of the data memory 204. Thereafter, commands in the print job data are sequentially analyzed, and a process corresponding to each of the commands is performed. Note that the print job data includes data to be printed for the print job and the print setting information indicating the print settings for the print process. That is, in step S501, storage control is performed so that the data to be printed (or an image rasterized on the basis of the data to be printed) and the print setting information are stored in the data memory 204.

In step S502, the above-described print setting information is extracted from a set of the commands in the print job data received in step S501. Thereafter, the sheet size in the print settings is acquired and is stored in a predetermined area of the work memory 205 as a preset sheet size. The preset sheet size is specified by the user of the smart device 208 through, for example, a screen of the smart device 208.

In step S503, the CPU 201 acquires the data format of the print job and stores the data format in a predetermined area of the work memory 205. Subsequently, in step S504, the CPU 201 examines the data format stored in step S503 and determines whether the data format is to be subjected to a fitting process. More specifically, it is determined whether the data format stored in step S503 is a predetermined format that is to be subjected to the fitting process. An example of the predetermined format is a joint photographic experts group (JPEG) format. If, in step S504, the data format acquired in step S503 is JPEG, it is determined that the data format is to be subjected to the fitting process. Thus, the processing proceeds to step S505, where the fitting process is performed as described below. However, if, in step S504, the data format acquired in step S503 is a portable document format (PDF), the page size may be predefined in the file. Accordingly, it is determined that a PDF is not to be subjected to the fitting process. Thus, the processing proceeds to step S506, where a process in a preset sheet size print mode is performed as described below. Note that instead of the size specified by the user in the print settings, the page size defined in the PDF may be used as a preset sheet size.

In the process performed in step S504, not only the data format is referenced but a reduce/enlarge setting in the print setting information may be referenced. For example, auto reduce/enlarge setting is specified as the reduce/enlarge setting, the processing may proceed to step S505 after the determination in step S504 is made. Alternatively, the determination as to whether the data format is subjected to a fitting process may be made on the basis of a variety of conditions, such as the type of a device that sends the print job received in step S501, the protocol used in the reception, or the mode of the printer 100 when the print job is received in step S501.

Figure 6:
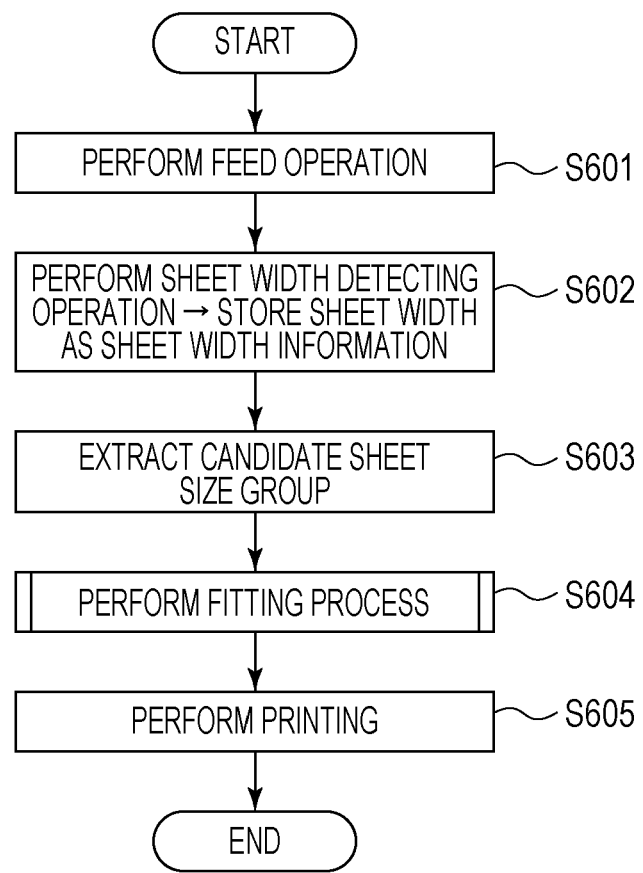
FIG. 6 is a flowchart of a fitting process.

FIG. 6 is a flowchart of the fitting process performed in step S505 in FIG. 5.

In step S601, the CPU 201 controls the printing mechanism to perform a feed operation. Thus, the topmost print sheet 104 of sheets 102 stacked on the paper feed tray 101 is picked up by the feed roller 103 and is conveyed until the leading edge of the print sheet 104 reaches the position of the platen 111. Subsequently, the processing performed by the CPU 201 proceeds to step S602, where the CPU 201 controls the carriage 113 and the sheet sensor 118 to perform a sheet width detecting operation. Thereafter, the CPU 201 stores the detected sheet width in a predetermined area of the work memory 205 as sheet width information.

Subsequently, the processing performed by the CPU 201 proceeds to step S603, where the CPU 201 references the sheet size table illustrated in FIG. 4A or 4B using the sheet width information stored in step S602 and extracts all the standard sheet sizes corresponding to the sheet width indicated by the sheet width information. The CPU 201 stores the extracted standard sheet sizes in a predetermined area of the work memory 205 as a candidate sheet size group.

Subsequently, the processing performed by the CPU 201 proceeds to step S604, where the fitting process described below is performed. After the fitting process is completed, the processing performed by the CPU 201 proceeds to step S605, where the CPU 201 controls the printing mechanism to print, on the print sheet 104, the image data subjected to the fitting process and stored in the image memory 206.

Figure 7:
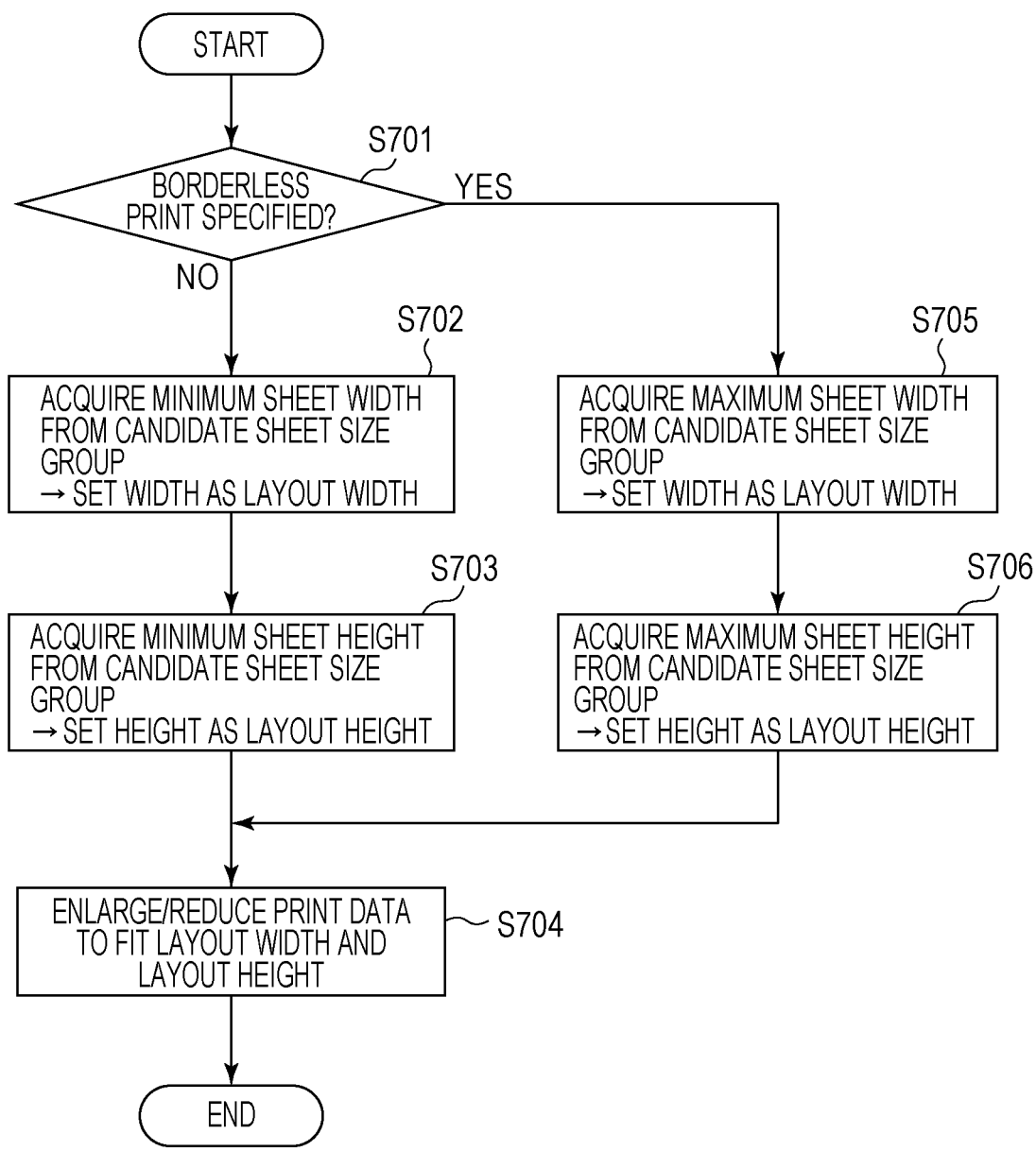
FIG. 7 is a flowchart illustrating the details of the fitting process.

FIG. 7 is a flowchart illustrating the details of the fitting process performed in step S604 in FIG. 6.

In step S701, the CPU 201 determines whether borderless print setting is specified for the print job received in step S501. According to the present exemplary embodiment, "margin setting" in the print setting information of the print job indicates whether borderless printing is to be performed. For example, through a screen of the smart device 208 that sends the print job, the user specifies whether borderless printing is to be performed. This specification is included in the print setting information. In step S701, by referencing the print setting information, the CPU 201 determines whether an image is printed in a borderless mode.

If, in step S701, the image is printed in a non-borderless mode, the processing proceeds to step S702. In step S702, the CPU 201 obtains the minimum sheet width among the sheet widths in the candidate sheet size group and stores the minimum sheet width in a predetermined area of the work memory 205 as a layout width. Subsequently, in step S703, the CPU 201 obtains the minimum sheet height among the sheet heights in the candidate sheet size group and stores the minimum sheet height in a predetermined area of the work memory 205 as a layout height.

However, if, in step S701, a borderless print mode is selected for the print job, the processing proceeds to step S704. In step S704, the CPU 201 obtains the maximum sheet width among the sheet widths in the candidate sheet size group and stores the maximum sheet width in a predetermined area of the work memory 205 as a layout width. Subsequently, in step S705, the CPU 201 obtains the maximum sheet height among the sheet heights in the candidate sheet size group and stores the maximum sheet height in a predetermined area of the work memory 205 as a layout height.

After the CPU 201 determines the layout widths and the layout heights through the processes performed in steps S701 to S705, the processing performed by the CPU 201 proceeds to step S706. In step S706, the CPU 201 reduces or enlarges the image to be printed based on the data to be printed contained in the print job data so that the image fits the stored layout width and layout height. Thereafter, the CPU 201 stores the image in the image memory 206 in the data memory 204.

If a borderless mode is specified, the image to be printed is laid out in a layout area that is larger than the candidate sheet size through the processes illustrated in FIG. 7. Accordingly, the image can be printed in a borderless mode on a sheet that has any one of the print sheet sizes in the candidate sheet size group and that is set in the printer.

Note that in the above description, in either using non-borderless or borderless mode, the maximum or minimum width and height are obtained from the candidate sheet size group, and the layout width and layout height are determined. However, a sheet size that does not support the borderless mode may be included in accordance with the structure of the platen 111 of the printer 100, the type of sheet, or the use of the sheet. In such a case, in the layout determination process performed for the borderless mode in steps S705 and S706, the maximum width and the maximum height may be obtained from among only the sheet sizes in the candidate sheet size group that support the borderless mode.

Figure 8:
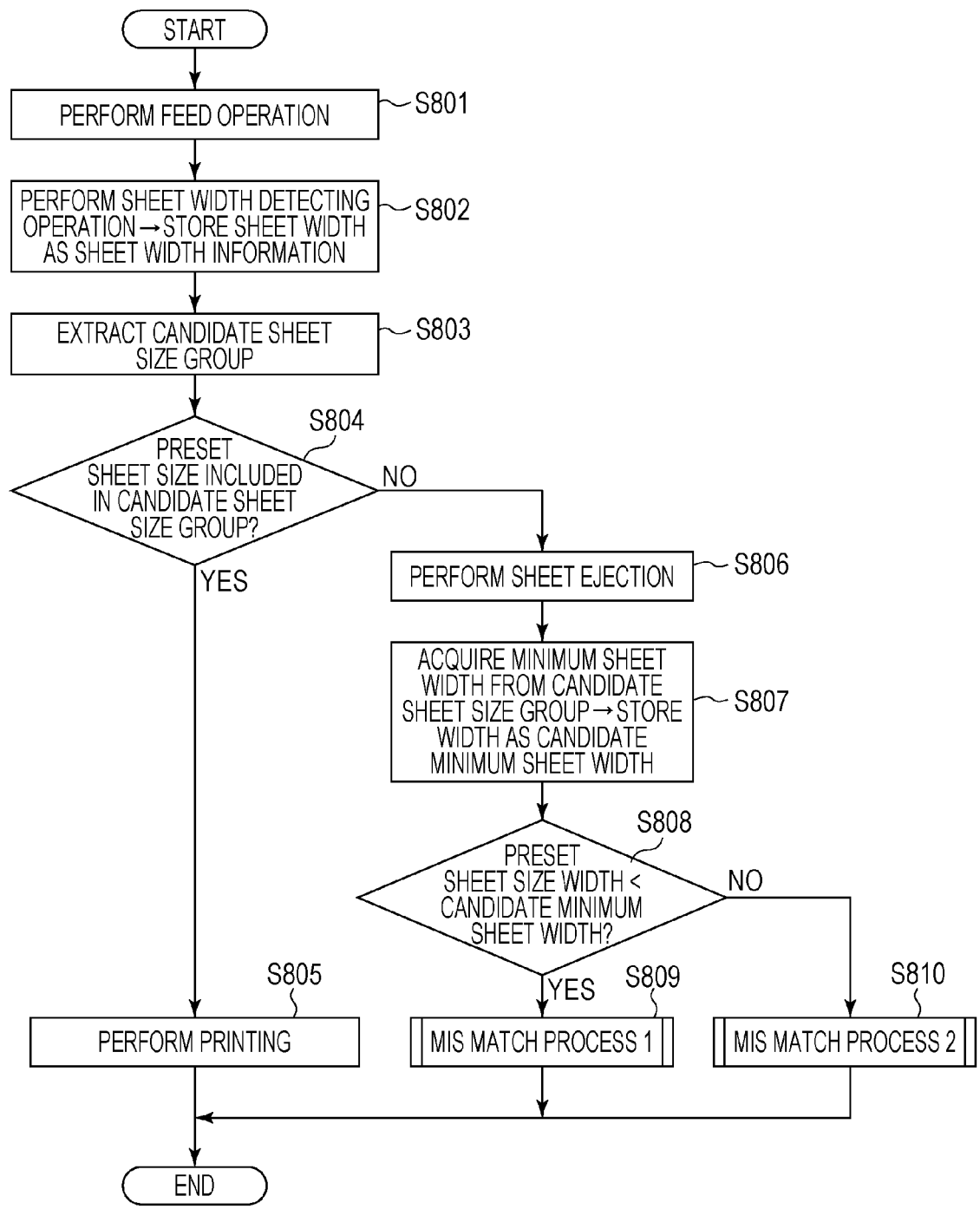
FIG. 8 is a flowchart of a process in a preset sheet size print mode.

FIG. 8 is a flowchart of a preset sheet size print mode performed in step S506 in FIG. 5. Since the processes performed in steps S801 through S803 are the same as those in steps S601 through S603 described above, respectively, description of the processes is not repeated.

In step S804, the CPU 201 determines whether the preset sheet size acquired in step S502 is included in the candidate sheet size group acquired in step S802. If it is determined that the preset sheet size is included in the candidate sheet size group, the processing proceeds to step S805, where printing is performed in accordance with the preset sheet size.

However, if, in step S804, it is determined that the preset sheet size is not included in the candidate sheet size group, the processing proceeds to step S806, where the print sheet conveyed on the platen is ejected.

Subsequently, the processing proceeds to step S807, where the minimum sheet width is acquired from the candidate sheet size group and is stored in a predetermined area of the work memory 205 as the minimum width among the widths of the candidate sheet sizes.

Subsequently, in step S808, the CPU 201 compares the width of the preset sheet size and the minimum width among the widths of the candidate sheet sizes stored in step S807. If it is determined that the width of the preset sheet size is less than the minimum width among the widths of the candidate sheet sizes, the processing proceeds to step S809, where a mismatch process 1 (described in more detail below) is performed. When the width of the preset sheet size is less than the minimum width among the widths of the candidate sheet sizes and if, for example, the image to be printed is printed to fit the preset sheet size, the image can be printed without losing the side portions of the image, since the width of the image is less than the width of the print sheet set in the printer. Thus, if the width of the preset sheet size is less than the minimum width among the widths of the candidate sheet sizes, it is determined that printing of an image having a size corresponding to the preset sheet size on a sheet set in the printer 100 is allowed. Accordingly, the mismatch process 1 provides the user with an option to perform printing so that the image is printed to fit the preset sheet size. The mismatch process 1 is described in more detail below.

However, if it is determined that the width of the preset sheet size is not less than the minimum width among the widths of the candidate sheet sizes, it can be determined that the size having a width that is greater than the width of the preset sheet size is included in the candidate sheet sizes. For example, the width of the preset sheet size is greater than any one of the widths of the candidate sheet sizes, a mismatch process 2 is performed in step S810. Alternatively, when the size having a width less than the width of the preset sheet size and the size having a width greater than the width of the preset sheet size are included in the candidate sheet sizes and if the width of the preset sheet size is not included in the above-described ranges of the widths of the candidate sheet sizes, the mismatch process 2 is performed in step S810. In such a case, if an image having a size corresponding to the preset sheet size is printed on a print sheet set in the printer 100, the image with some section missing may be printed, since the width of the image is greater than the width of the print sheet. Accordingly, if it is determined that the width of the preset sheet size is not less than the minimum width among the widths of the candidate sheet sizes, it is determined in step S808 that printing of an image having a size corresponding to the preset sheet size on a sheet set in the printer 100 is not allowed. Thereafter, the mismatch process 2 is performed. In the mismatch process 2, control is performed so that an option to select printing an image to fit the preset sheet size is not provided to the user. The mismatch process 2 is described in more detail below.

Figure 9:
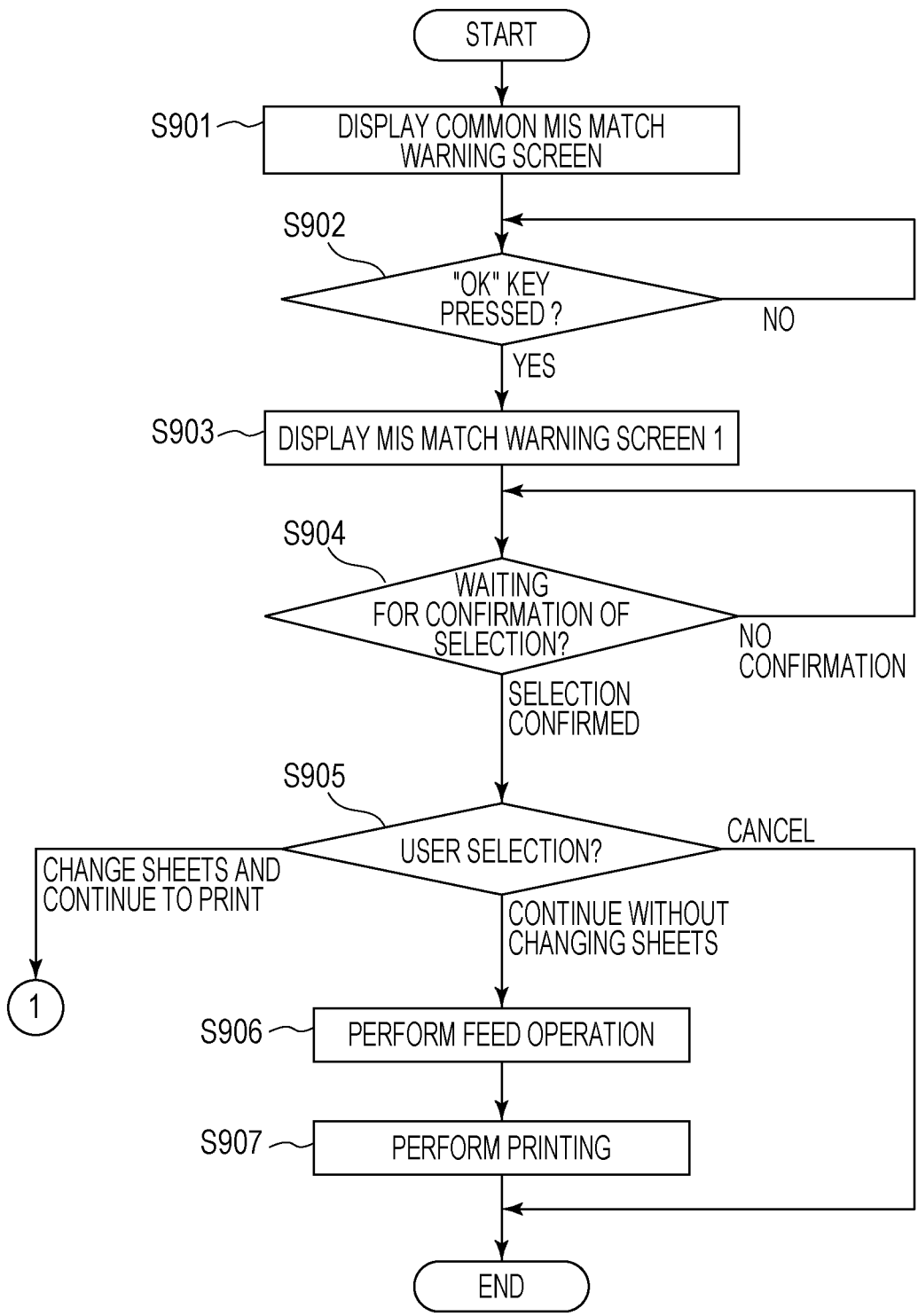
FIG. 9 is a flowchart of a mismatch process 1.

FIG. 9 is a flowchart of the mismatch process 1 performed in step S809 in FIG. 8.

Figure 11:
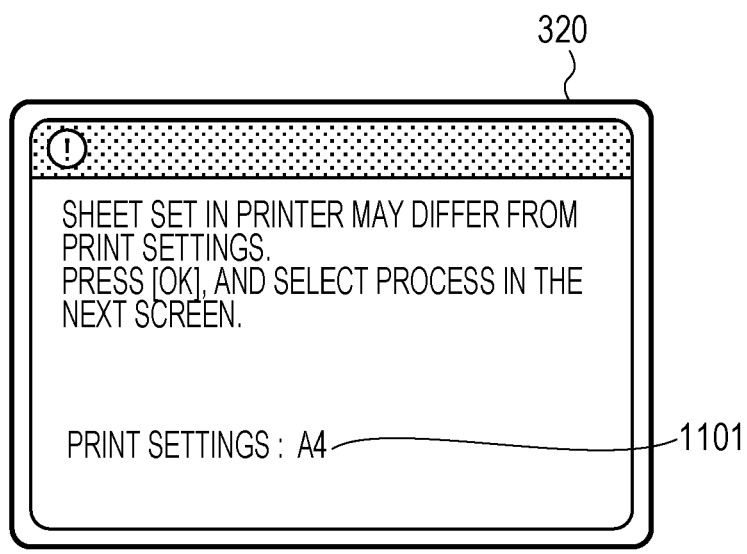
FIG. 11 illustrates an example of an error screen displayed in the mismatch process 1.

In step S901, the CPU 201 performs display control so that a common mismatch warning screen is displayed on the operation panel 218. As illustrated in FIG. 11, the common mismatch warning screen allows the user to be aware that a correct type of sheet may not be set in the printer. At the same time, the preset sheet size included in the print job is displayed (a reference number 1101). In this manner, the user can be aware of the correct size of a sheet to be set.

Figure 12A:
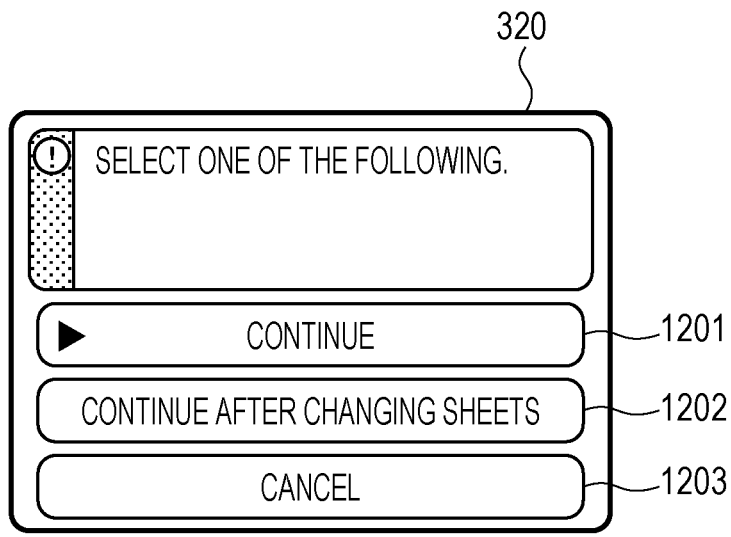
FIGS. 12A and 12B illustrate examples of an error screen displayed in a mismatch process 2.

In step S902, the CPU 201 enters in a ready mode until the user presses an "OK" key (not illustrated) on the operation panel 218. Upon detecting that the user presses the "OK" key, the processing proceeds to step S903, where the CPU 201 performs display control so that a mismatch warning screen 1 is displayed on the operation panel 218. As illustrated in FIG. 12A, the mismatch warning screen 1 includes the following three options that the user can select: "Continue without changing sheets" (a reference number 1201), "Change sheets and continue to print" (a reference number 1202), and "Cancel (a reference number 1203)".

The option "Continue without changing sheets" inquires whether the user accepts mismatch between the sheet sizes and still continues to print an image that fits the preset sheet size on the print sheet currently set in the printer. For example, when the preset sheet size specified in the print job is B5 and if the user currently has only A4 sheets, the user selects this option. Alternatively, in some cases, the user prints an L-sized picture on an A4 plain paper sheet in order to check the result of printing before the user prints the picture on an L-sized photo paper sheet. That is, in general, a glossy photo paper sheet is more costly than a plain paper sheet. Accordingly, to check the print result of a picture, the user may print the picture on an A4 plain paper sheet that is larger than an L-sized paper sheet for test purpose before the user prints the picture on an L-size photo paper sheet. The above-described option "Continue without changing sheets" is selected by a user for such a purpose.

The option "Change sheets and continue to print" is selected when the user is aware that mismatch of the sheet sizes occurs and wants to change the sheets to sheets that fit the sheet size specified in the print job and continue printing. At that time, as described above, the preset sheet size specified in the print job is displayed in the common mismatch warning screen. Accordingly, the user can set sheets having that size on the paper feed tray 101. The option "Cancel" is selected when the user cancels printing.

After the mismatch warning display screen 1 is displayed, the processing proceeds to step S904, where the CPU 201 enters a ready state to wait for user's confirmation of the selection. By pressing an "UP" key or a "DOWN" key (not illustrated) on the operation panel 218, the user can select one of the three options. Thereafter, by pressing an "OK" key, the user can confirm the selected option. Upon detecting that the user performs an operation to confirm the selection, the processing proceeds to step S905, where the CPU 201 determines which option is selected. If the "Continue without changing sheets" option is selected, the processing proceeds to step S906.

In step S906, the print sheet is fed from the paper feed tray 101 again. Thereafter, the processing proceeds to step S907, where an image to be printed having a size corresponding to the preset sheet size included in the print job is printed on the print sheet fed in step S906.

Note that in the mismatch process 1 according to the present exemplary embodiment, the preset sheet size is not included in the candidate sheet size group, and the width is less than each of the widths of the candidate sheet size group. Accordingly, if the user selects the "Continue without changing sheets" option and, thus, the printing continues, an image having a width that is less than the width of the print sheet set in the printer is printed. Consequently, the image to be printed can be printed on the print sheet without losing any portion of the image in the width direction of the print sheet.

In contrast, if, in step S905, the user selects the "Change sheets and continue to print" option, the process in the preset sheet size printing mode is performed in step S506 again. At that time, control is performed so that an image to be printed in the print job received in step S501 and the print setting information, such as the preset sheet size acquired in step S502, stored in the data memory 204 are maintained. Accordingly, even when the user does not re-transmit the print job or do not perform an operation to specify the preset sheet size, the process illustrated in FIG. 8 can be performed again by changing the print sheets set in the printer 100. In this manner, the operations from the feed operation to a sheet width detecting operation are performed again and, thus, mismatch about the changed sheet can be checked.

If, in step S905, the "Cancel" option is selected, the print job is discarded, and the processing is completed. More specifically, the image to be printed in the print job received in step S501 and the print setting information, such as the preset sheet size received in step S502, become deletable from the data memory 204.

Figure 10:
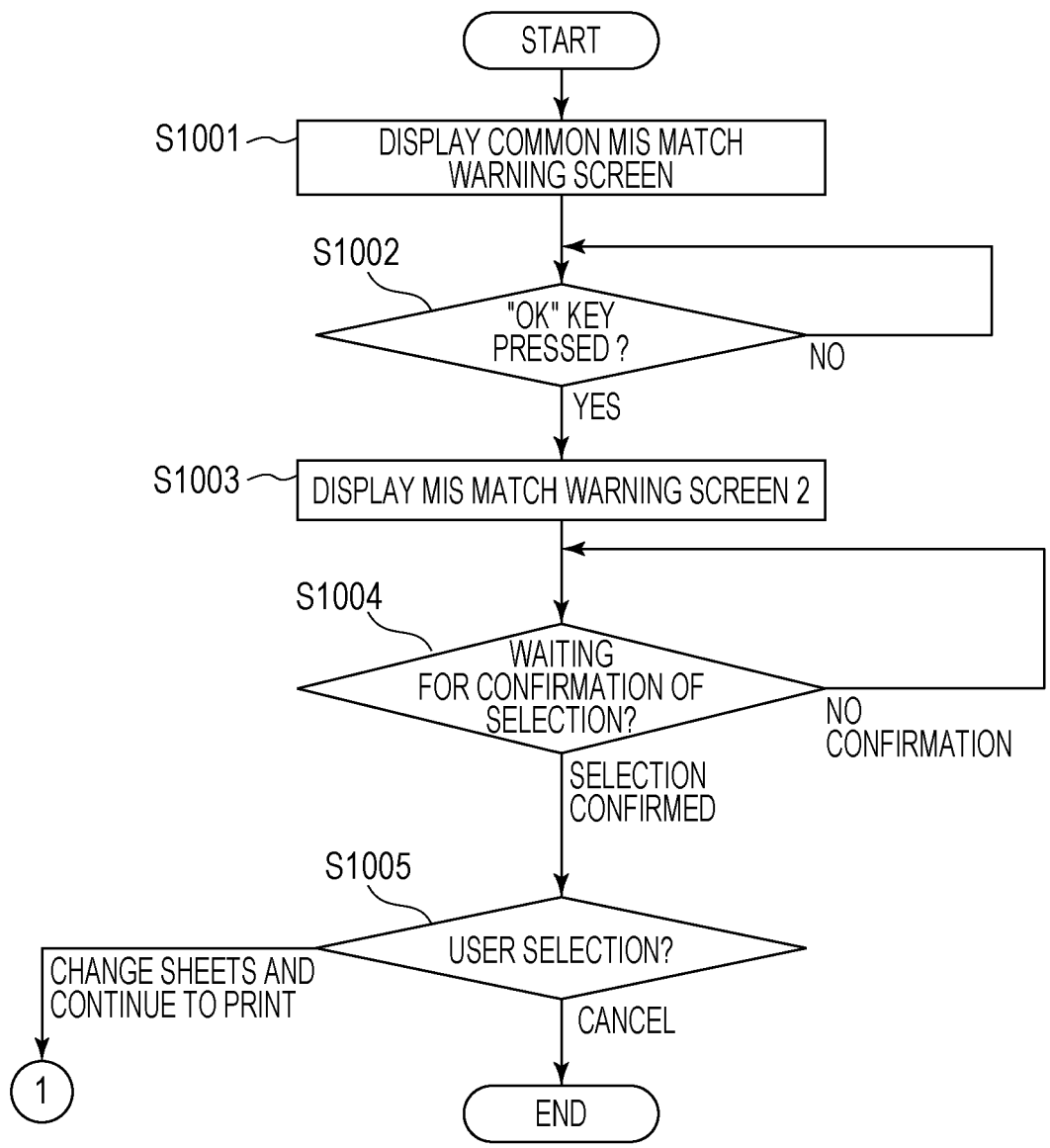
FIG. 10 is a flowchart of a mismatch process 2.

FIG. 10 is a flowchart of the mismatch process 2 performed in step S809 in FIG. 8. In the mismatch process 2, the CPU 201 displays the common mismatch warning screen on the operation panel 218 first in step S1001. The common mismatch warning screen is the same as that displayed in step S901 of the mismatch process 1 described above.

Figure 12B:
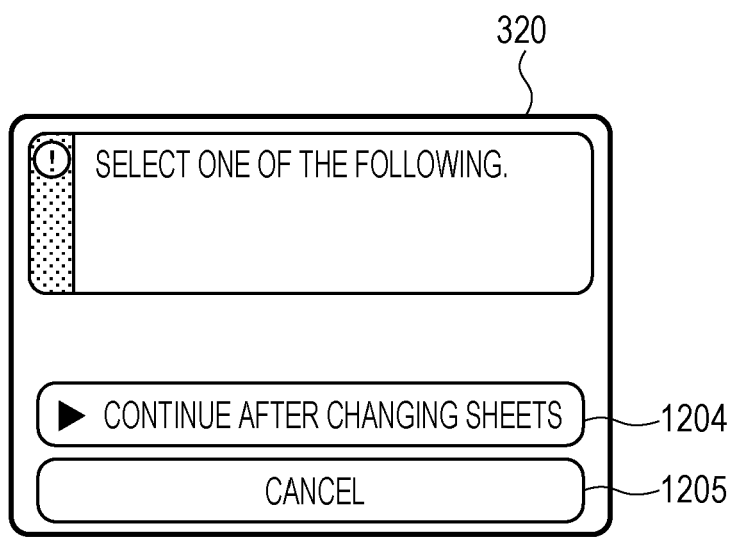

Subsequently, in step S1002, the CPU 201 enters in a ready mode until the user presses an "OK" key (not illustrated) on the operation panel 218. Upon detecting that the user presses the "OK" key, the processing proceeds to step S1003, where the CPU 201 performs display control so that a mismatch warning screen 2 is displayed on the operation panel 218. As illustrated in FIG. 12B, the mismatch warning screen 2 includes the following two options that the user can select: "Change sheets and continue to print" (a reference number 1204) and "Cancel" (a reference number 1205). Unlike the mismatch warning display screen 1, the "Continue without changing sheets" option is not displayed in the mismatch warning display screen 2 and, thus, the user cannot select the "Continue without changing sheets" option. After the mismatch warning display screen 2 is displayed, the processing proceeds to step S1004, where the CPU 201 waits for user's confirmation of the selection.

By pressing an "UP" key or a "DOWN" key (not illustrated) on the operation panel 218, the user selects one of the two options. Thereafter, by pressing an "OK" key, the user can confirm the selected option. Upon detecting that the user confirms the selection, the processing proceeds to step S1005, where the CPU 201 determines which option is selected. If the "Change sheets and continue to print" option is selected, the process in step S506 is performed. That is, the process in the preset sheet size print mode is performed. In this manner, the operations from the feed operation to a sheet width detecting operation are performed again and, thus, mismatch about the changed sheet can be checked. However, if, in step S1005, the "Cancel" option is selected, the print job is discarded, and the processing is completed.

As described above, according to the present exemplary embodiment, it is determined whether the preset sheet size specified in the print settings is included in the candidate sheet sizes obtained by detecting the print sheet set in the printer using the sheet sensor. If the preset sheet size is not included in the candidate sheet sizes, the warning screen is displayed to the user.

If, in the warning screen, the width of the preset sheet size is less than the width of any one of the candidate sheet sizes, the "Continue without changing sheets" option is provided to the user through the mismatch process 1. However, if a size having a width greater than the width of the preset sheet size is included in the candidate sheet sizes, the "Continue without changing sheets" option is not provided to the user through the mismatch process 2.

That is, if a size having a width greater than the width of the preset sheet size is included in the candidate sheet sizes, the image without a side portion may be printed. Thus, through the mismatch process 2, control is performed so that an option to print an image to fit the preset sheet size is not provided to the user in the warning screen. In this manner, printing of an image being cropped in the width direction can be prevented, as described above.

In step S808, the width of the preset sheet size is compared with each of the widths of the candidate sheet sizes. However, in addition to the comparison of the widths, the height of the preset sheet size may be compared with each of the heights of the candidate sheet sizes. If the width of the preset sheet size is less than the minimum width of the candidate sheet sizes and if the height of the preset sheet size is less than the minimum height of the candidate sheet sizes, the mismatch process 1 may be performed. Otherwise, the mismatch process 2 may be performed.

In this manner, printing of an image being cropped in not only the width direction but the height direction can be prevented. That is, if the width of the preset sheet size is less than the minimum width of the candidate sheet sizes and if the height of the preset sheet size is less than the minimum height of the candidate sheet sizes, any one of the candidate sheet sizes of sheets set in the printer is larger than the preset sheet size. At that time, if the user selects the "Continue without changing sheets" option displayed through the mismatch process 1, the whole image to be printed corresponding to the preset sheet size is printed on the print sheet. However, if the mismatch process 2 is performed, an edge of an image to be printed having a size corresponding to the preset sheet size in one or both of the width and height direction does not protrude beyond the edge of the print sheet and, thus, any portion of the image is not cropped in printing.

While the above exemplary embodiment has been described with reference to a print job received from the smart device 208 connected to the printer via the interface, printing may be remotely performed via a telephone line or a network line. In addition, while the above exemplary embodiment has been described with reference to a print job sent from the smart device 208, the print job may be sent from a device other than a smart device (e.g., a cell phone, a host computer, or a digital TV) instead of the smart device 208. In addition, the printer may directly receive a print job from a device that the user operates or receive a print job via an intermediate device, such as a server or a cloud service.

Figure 13:
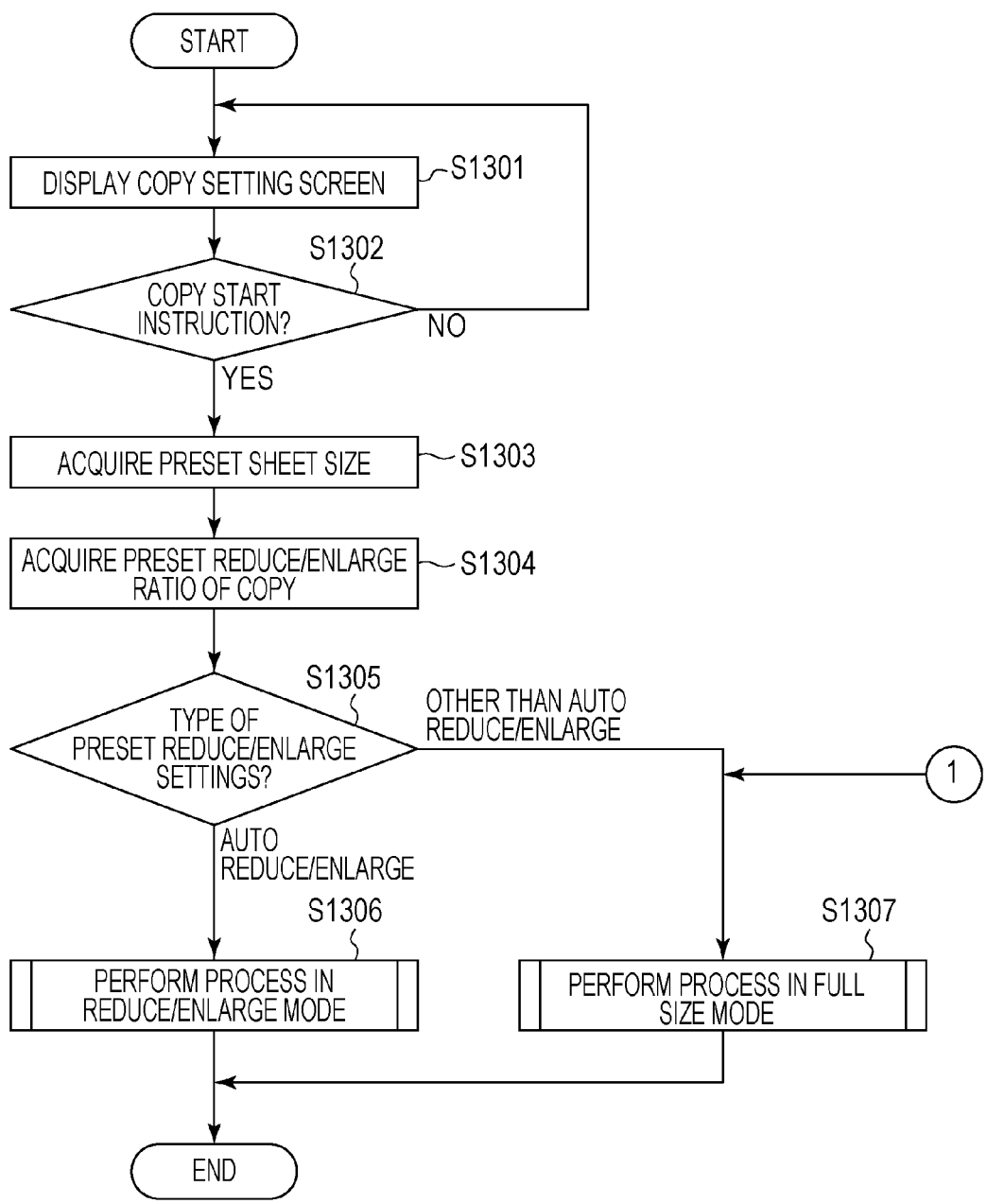
FIG. 13 is a flowchart of a process performed during a copy operation.

FIG. 13 is a flowchart of a process performed by the CPU 201 when a copy operation is performed in the printer 100 according to the present exemplary embodiment. Note that since the configurations of a printing mechanism, a platen 111, a print head 112, and a control unit of the printer 100 according to the present exemplary embodiment are the same as those described above, descriptions of the configurations are not repeated.

The processes indicated by the flowchart are performed by the CPU 201 when a user selects a copy function displayed on the operation panel 218 of the printer 100. In step S1301, the CPU 201 displays a copy setting screen (not illustrated) on the operation panel 218 of the printer 100 first. The copy setting screen is used by the user to specify parameters related to a copy operation, such as the copy sheet size, the number of copies, the print density, copy reduce/enlarge settings, and borderless/non-borderless printing. At that time, the CPU 201 monitors an input of user operation performed on the operation panel 218 and receives an instruction to change the parameters or an instruction to start a copy operation. If, in step S1302, the CPU 201 receives an instruction to start a copy operation, the processing performed by the CPU 201 proceeds to step S1303. In step S1303, the CPU 201 acquires a sheet size selected by the user in step S1301 and stores the selected sheet size in a predetermined area of the work memory 205 as preset sheet size information. Thereafter, the processing proceeds to step S1304, where the CPU 201 acquires the copy reduce/enlarge settings specified by the user in step S1301 and stores the copy reduce/enlarge settings in a predetermined area of the work memory 205 as preset copy reduce/enlarge setting information. Thereafter, the processing proceeds to step S1305, where the CPU 201 determines whether the stored preset copy reduce/enlarge setting indicates an auto reduce/enlarge mode. If the stored preset copy reduce/enlarge setting indicates auto reduce/enlarge mode, the processing proceeds to step S1306, where the above-described fitting process is performed. However, if, in step S1305, the copy reduce/enlarge setting indicates a mode other than the auto reduce/enlarge mode (e.g., an "actual page size" mode or an "A4 to B5" standard size mode), the processing proceeds to step S1307, where the above-described preset sheet size printing process is performed. Since the fitting process and the preset sheet size printing process are the same as those in the above description, descriptions of the processes are not repeated.

Note that the "preset sheet size" described in the above-described exemplary embodiment is not limited to the size specified by the user using a device that transmits the print job. For example, the size may be input to the printer 100 by the user using the operation panel 218 of the printer 100. In addition, the "preset sheet size" is not limited to the size specified by the user. For example, the preset sheet size may be automatically set in accordance with a variety of conditions, such as the type of device or the type of application that transmit the print job or the print mode of the printer 100.

While the above exemplary embodiment has been described with reference to determination of the size of a print sheet on the basis of the result of detection output from the sheet sensor 118 when printing is performed on the basis of the print job received from an external device of the printer 100 or when a copy function of the printer 100 is performed, the time the determination is made is not limited thereto. For example, the above-described determination of the print sheet size may be made when an image stored in the memory card 223 mounted in the memory card slot 222 is printed on the basis of the print settings set by the user through the operation panel 218. Alternatively, in step S504, if the sheet size is not specified in the print setting information indicating the print settings set by the user, the above-described fitting process may be performed. Note that the case where the sheet size is not specified in the print setting information includes the case where the sheet size is not included the print setting information. In addition, the case where the sheet size is not specified in the print setting information includes the case where the print setting information includes an instruction to perform a sheet size setting process in accordance with the sheet size corresponding to the result of detection of the sheet width by the sheet sensor 118.

In addition, when the user prints an image using the printer 100 in accordance with the print settings specified by the user, the image may be stored in not only the external memory, such as the memory card 223, but an internal memory of the printer 100. Alternatively, an image stored in an external device connected to the printer 100 (e.g., a server) may be printed in accordance with the print settings specified by the user through the operation panel 218 of the printer 100.

Still furthermore, while the above-described exemplary embodiment has been described with reference to an example in which the sheet sensor 118 of the printer 100 detects the width of a sheet, the height of the sheet may be detected by the sensor. Alternatively, both the width and height may be detected. In either detection method, if a plurality of candidates of the size of the print sheet used in the printer 100 exist, an appropriate sheet size can be selected through the processes according to the above-described exemplary embodiment.

In addition, application of the present exemplary embodiment is not limited to the case in which the sheet size is automatically detected by a sensor. For example, the user may specify, through the operation panel of the printer, the sheet size of sheets stored in a cassette of a printer or the sheet size of a sheet set in a manual paper feeding port by the user. Thereafter, the sheet size automatically detected by the sensor in the above-described exemplary embodiment may be replaced with the size specified by the user. In this manner, the above-described processes may be performed.

Note that in such a case, the user can specify the sheet size at any time. For example, a sensor that detects whether the cassette of the printer is open or closed or a sensor for detecting the presence of a sheet in the manual paper feeding port is provided in the printer. If the sensor detects that the cassette is opened and, thereafter, is closed or if the sensor detects that a sheet is set in the manual paper feeding port, a screen used by the user to specify the size and type of the sheet is displayed on the operation panel of the printer. In this manner, the size specified by the user through the screen may be used instead of the size detected by the sensor in the above-described exemplary embodiment.

While the above exemplary embodiment has been described with reference to the determination process illustrated in FIG. 6 and performed by the CPU 201 of the printer 100 serving as the print control apparatus, the device serving as the print control apparatus is not limited thereto. For example, the processes according to the present exemplary embodiment may be performed by a host computer or a server that causes the printer 100 connected thereto to perform printing. At that time, the host computer or the server serves as the print control apparatus according to the present exemplary embodiment.

More specifically, when the host computer, the server, or the smart device transmits a print job to the printer 100, the process illustrated in FIG. 5 is performed. That is, when such a device transmits the print job to the printer 100, information regarding the sheet width of a print sheet detected by the sheet sensor 118 of the printer 100 is acquired. Thereafter, a candidate of the size of the print sheet is identified in accordance with the sheet width indicated by the acquired information, and a layout area is identified using the identified candidate and the preset sheet size. Thereafter, for the layout area, an image to be printed is rasterized in the memory of the host computer, the server, or the smart device. The rasterized image is sent to the printer 100 in the form of a print job. Thereafter, the printer 100 performs printing. More specifically, under the control of the CPU 201 of the printer 100, the printing mechanism of the printer 100 prints the image received from the host computer, the server, or the smart device on the print sheet.

Note that in the above-described configuration, if the printing operation is canceled in FIG. 9 or 10, an error message is issued in the host computer, the server, or the smart device. More specifically, the screens illustrated in FIGS. 11 to 13 are displayed in the host computer, the server, or the smart device. If the error message is displayed by the host computer, the error message is displayed on a display unit of the host computer or an external display unit connected to the host computer. If the error message is displayed by the server, the server sends the information regarding the error message to a client device that sent the print job to the server, and the client device displays the error message on an internal display unit or an external display unit of the client device.

As another example in which the host computer, the server, or the smart device performs the processes according to the present exemplary embodiment, the processes other than the processes in step S605 of FIG. 6, step S704 of FIG. 7, step S805 of FIG. 8, and step S907 of FIG. 9 may be performed by the host computer, the server, or the smart device. In such a case, printing of an image to be printed stored in the image memory 206 is performed by the printing mechanism under the control of the CPU 201 of the printer 100. Comparison of the preset sheet size and each of the candidate sheet sizes and the rasterizing process of the image to be printed before printing process is performed are performed by the host computer, the server, or the smart device. Alternatively, the processes according to the present exemplary embodiment can be assigned to the printer 100 and one of the host computer, the server, and the smart device in a various way.

While the above exemplary embodiment has been described with reference to a paper print sheet as an example of a print medium on which an image is printed by a printer, the print medium is not limited thereto. For example, an overhead projector (OHP) sheet may be employed. In addition, the shape of the print medium is not limited to rectangle. For example, the print medium may be a disk-shaped recording medium, such as a compact disc (CD) or a digital versatile disk (DVD).

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The computer executable instructions for realizing the functions according to the present exemplary embodiment may be executed by a single computer (a CPU or an MPU) or a plurality of computers that cooperate with one another. Alternatively, the computer executable instructions may be executed by a computer or hardware that is designed to provide the functions (e.g., a circuit). Still alternatively, the function of some of the computer executable instructions may be provided by hardware, and the computer executable instructions for the remaining functions may be executed by a computer.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-137057 filed Jun. 28, 2013, which is hereby incorporated by reference herein in its entirety.

What is claimed is:

1. A print control apparatus comprising:
    an acquiring unit configured to acquire a preset size of a print medium set in print settings for printing of data and one or more candidates of a size of the print medium which has been set in a print unit;
    a display control unit configured to display, on a display unit, a first screen in which one of a first instruction to execute the printing and a second instruction to inhibit the printing can be selected, or a second screen in which the first instruction cannot be selected and the second instruction can be selected,
    wherein the first screen is displayed if the preset size and the one or more candidates acquired by the acquiring unit satisfy a predetermined condition, and the second screen is displayed if the preset size and the one or more candidates do not satisfy the predetermined condition; and
    a print control unit configured to, if the first instruction is provided to the first screen displayed by the display control unit, cause the print unit to print an image having a size corresponding to the preset size, on the print medium,
    wherein if the second instruction is provided to the first screen or the second screen displayed by the display control unit, the printing is not performed.

2. The print control apparatus according to claim 1, further comprising:
    a storage control unit configured to store the image to be printed by the print control unit,
    wherein the display control unit displays the first screen in which a third instruction to maintain the stored image and cancel the printing to be executed by the first instruction can be selected and wherein if the third instruction is provided to the first screen, the print control unit causes the print unit to print the image on another print medium.

3. The print control apparatus according to claim 1,
    wherein if the preset size and the one or more candidates do not satisfy the predetermined condition, the print control unit causes the print unit to print an image, based on the data to be printed, having a size based on the one or more candidates.

4. The print control apparatus according to claim 3,
wherein if the preset size and the one or more candidates do not satisfy the predetermined condition, the print control unit causes the print unit to print an image having a size based on the one or more candidates and margin settings that define a margin provided in the print medium.

5. The print control apparatus according to claim 1,
wherein if the preset size is smaller than each of the one or more candidates for the print medium, the predetermined condition is satisfied.

6. The print control apparatus according to claim 1, wherein the one or more candidates are obtained by using a sensor detecting a width of the print medium which has been set in the print unit.

7. The print control apparatus according to claim 6,
wherein the print control unit individually selects a width and a height corresponding to margin settings from widths and heights of the one or more candidates of the size of the print medium obtained by detecting the width of the print medium using the sensor and causes the print unit to print an image having a size based on the selected width and height.

8. The print control apparatus according to claim 7,
wherein the margin settings are information for setting whether a margin is provided in the print medium.

9. The print control apparatus according to claim 8,
wherein if the margin setting is made so that a margin is not provided in the print medium, the print control unit prints an image having a size larger than any one of the one or more candidates.

10. The print control apparatus according to claim 6,
wherein the print unit conveys the print medium to a position corresponding to a print head and performs printing on the conveyed print medium using the print head, and
wherein the sensor is disposed at the position corresponding to the print head and, if the print medium is conveyed to the position of the sensor, the sensor detects the size of the print medium.

11. The print control apparatus according to claim 6,
wherein the sensor detects a width of the print medium by the sensor, and the one or more candidates are one or more candidates of the size of the print medium based on the detected width of the print medium.

12. A print control method comprising:
acquiring a preset size of a print medium set in print settings for print of data and one or more candidates of a size of the print medium obtained by a sensor that detects the size of the print medium which has been set in a print unit;
displaying a first screen in which one of a first instruction to execute the printing and a second instruction to inhibit the printing can be selected, or a second screen in which the first instruction cannot be selected and the second instruction can be selected,
wherein the first screen is displayed if the preset size and the one or more candidates satisfy a predetermined condition, and the second screen is displayed if the preset size and the one or more candidates do not satisfy the predetermined condition; and
causing, if the first instruction is provided to the displayed first screen, the print unit to print an image having a size corresponding to the preset size, on the print medium,
wherein if the second instruction is provided to the first screen or the displayed second screen, the printing is not performed.

13. The print control method according to claim 12, further comprising:
storing the image to be printed,
wherein the second instruction includes a third instruction to maintain the stored image and cancel the printing to be executed by the first instruction and a fourth instruction to cancel the printing to be executed by the first instruction without maintaining the stored image
and wherein one of the first instruction, the third instruction, and the fourth instruction can be selected in the first screen, and one of the third instruction and the fourth instruction can be selected in the second screen.

14. The print control method according to claim 12,
wherein if the preset size and the one or more candidates do not satisfy the predetermined condition, printing of an image based on the data to be printed having a size based on the one or more candidates is performed.

15. The print control method according to claim 14,
wherein if the preset size and the one or more candidates do not satisfy the predetermined condition, printing of an image having a size based on the one or more candidates and margin settings that define a margin provided in the print medium is performed.

16. The print control method according to claim 12,
wherein if the preset size is larger than each of the one or more candidates for the print medium, the printing of the image having a size corresponding to the preset size on the print medium is allowed.

17. The print control method according to claim 12, wherein the one or more candidates are obtained by using a sensor detecting a width of the print medium which has been set in the print unit.

18. The print control method according to claim 17,
wherein the print medium is conveyed to a position corresponding to a print head, and printing is performed on the conveyed print medium using the print head, and
wherein a sensor is disposed at the position corresponding to the print head and, if the print medium is conveyed to the position of the sensor, the size of the print medium is detected by the sensor.

19. The print control method according to claim 17,
wherein a width of the print medium is detected by the sensor, and the one or more candidates are one or more candidates of the size of the print medium based on the detected width of the print medium.

20. A non-transitory computer-readable storage medium storing computer executable instructions for causing a computer to execute a print control method, the print control method comprising:
acquiring a preset size of a print medium set in print settings for printing of data and one or more candidates of a size of the print medium obtained by a sensor that detects the size of the print medium which has been set in a print unit;
displaying a first screen in which one of a first instruction to execute the printing and a second instruction to inhibit the printing can be selected, or a second screen in which the first instruction cannot be selected and the second instruction can be selected,
wherein the first screen is displayed if the preset size and the one or more candidates satisfy a predetermined condition, and the second screen is displayed if the present size and the one or more candidates do not satisfy the predetermined condition; and causing, if the first instruction is provided to the first displayed screen, the print unit to print an image having a size corresponding to the preset size, on the print medium.

21. A printing apparatus, comprising:
a display unit configured to display a screen, and
a print unit configured to print an image,
wherein the display unit displays a designation screen for a user to designate a size of a print medium, if a cassette for containing the print medium is operated,
and wherein the display unit further displays a first display item for executing printing of an image and a second display item for inhibiting the printing, if a preset medium size set as a print setting for the printing is different from a designated size which has been designated in the designation screen,
and wherein the print unit prints the image if the executing of the printing is designated by using the first display item, and does not print the image if the inhibiting of the printing is designated by using the second display item.

22. The apparatus according to claim 21, further comprising the cassette.

23. The apparatus according to claim 21, wherein the display unit displays the first display item and the second display item in a same screen.

24. The apparatus according to claim 21, wherein the display unit displays the first display item and the second display item if the preset medium size is smaller than the designated size.

25. The apparatus according to claim 24, wherein the display unit displays the second display item and does not display the first display item, if the preset medium size is larger than the designated size.

26. The apparatus according to claim 21, wherein the display unit further displays a third display item for prompting a user to change the print medium contained in the cassette, if the preset medium size is different from the designated size.

27. The apparatus according to claim 21, wherein the print unit prints the image having a size corresponding to the preset size, if the executing of the printing is designated by using the first display item.

28. The apparatus according to claim 21, wherein the display unit displays the designation screen if an opened cassette closes.

29. A printing apparatus, comprising:
a display unit configured to display a screen, and
a print unit configured to print an image,
wherein the display unit displays a designation screen for a user to designate a size of a print medium, if a cassette for containing the print medium is operated,
and wherein the display unit further displays a first display item for executing a printing of an image and a second display item for inhibiting the printing, if a preset medium size set as a print setting for the printing does not correspond to a designated size which has been designated in the designation screen,
and wherein the print unit prints the image if the executing of the printing is designated by using the first display item, and does not print the image if the inhibiting of the printing is designated by using the second display item.

30. The apparatus according to claim 29 further comprising the cassette.

31. The apparatus according to claim 29, wherein the display unit displays the first display item and the second display item in a same screen.

32. The apparatus according to claim 29, wherein the display unit displays the first display item and the second display item, if the preset medium size is smaller than the designated size.

33. The apparatus according to claim 32, wherein the display unit displays the second display item and does not display the first display item, if the preset medium size is larger than the designated size.

34. The apparatus according to claim 29, wherein the display unit further displays a third display item for prompting a user to change the print medium contained in the cassette, if the preset medium size does not correspond to the designated size.

35. The apparatus according to claim 29, wherein the print unit prints the image having a size corresponding to the preset size, if the executing of the printing is designated by using the first display item.

36. The apparatus according to claim 29, wherein the display unit displays the designation screen if an opened cassette closes.

37. A print control method, comprising:
causing a display unit to display a designation screen for a user to designate a size of a print medium, if a sensor detects opening or closing of a cassette for containing the print medium,
causing the display unit to display a first display item for executing a printing of an image and a second display item for inhibiting the printing, if a preset medium size set as a print setting for the printing is different from a designated size which has been designated in the designation screen, and
causing a print unit to print the image if the executing of the printing is designated by using the first display item, and not to print the image if the inhibiting of the printing is designated by using the second display item.

38. A print control method, comprising:
causing a display unit to display a designation screen for a user to designate a size of a print medium, if a sensor detects opening or closing of a cassette for containing the print medium,
causing the display unit to display a first display item for executing a printing of an image and a second display item for inhibiting the printing, if a preset medium size set as a print setting for the printing does not corresponds to a designated size which has been designated in the designation screen, and
causing a print unit to print the image if the executing of the printing is designated by using the first display item, and not to print the image if the inhibiting of the printing is designated by using the second display item.

* * * * *